(12) United States Patent
Yamaguchi et al.

(10) Patent No.: US 8,052,175 B2
(45) Date of Patent: Nov. 8, 2011

(54) EXHAUST PIPE STRUCTURE

(75) Inventors: Junichi Yamaguchi, Kasugai (JP); Yoshiki Horie, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/910,937

(22) Filed: Oct. 25, 2010

(65) Prior Publication Data

US 2011/0036444 A1  Feb. 17, 2011

Related U.S. Application Data

(63) Continuation of application No. 12/095,151, filed as application No. PCT/IB2007/001833 on Jul. 4, 2007.

(30) Foreign Application Priority Data

Jul. 10, 2006  (JP) ................................ 2006-189460

(51) Int. Cl.
  *F16L 27/10*  (2006.01)
(52) U.S. Cl. ....................... 285/223; 285/147.1; 285/224
(58) Field of Classification Search .................... 285/49, 285/127.1, 128.1, 144.1, 147.1, 148.1, 148.3–148.4, 285/223–225; 60/322; 248/58, 60
  See application file for complete search history.

(56) References Cited

U.S. PATENT DOCUMENTS

| | | | | |
|---|---|---|---|---|
| 4,345,430 A | * | 8/1982 | Pallo et al. ....................... | 60/282 |
| 4,550,795 A | * | 11/1985 | Teshima .......................... | 180/296 |
| 4,658,581 A | * | 4/1987 | Hirabayashi .................... | 60/322 |
| 5,127,489 A | * | 7/1992 | Takato et al. .................... | 180/309 |
| 5,170,147 A | * | 12/1992 | Graffagno et al. ............. | 340/449 |
| 5,445,241 A | * | 8/1995 | Nakamura et al. ............. | 180/296 |
| 5,507,463 A | * | 4/1996 | Kobylinski et al. ........... | 248/610 |
| 5,966,932 A | | 10/1999 | Yahagi | |
| 5,967,193 A | * | 10/1999 | Nagai et al. .................... | 138/110 |
| 6,173,800 B1 | * | 1/2001 | Steenackers et al. ......... | 180/89.2 |

FOREIGN PATENT DOCUMENTS

| | | |
|---|---|---|
| DE | 197 22 146 A1 | 12/1997 |
| JP | 56-071627 A | 6/1981 |
| JP | 5-001530 A | 1/1993 |
| JP | 5-256130 A | 10/1993 |
| JP | 2000-64835 A | 2/2000 |
| JP | 2002-160536 A | 6/2002 |
| JP | 2005-219709 A | 8/2005 |

* cited by examiner

*Primary Examiner* — Aaron Dunwoody
*Assistant Examiner* — Fannie Kee
(74) *Attorney, Agent, or Firm* — Sughrue Mion, PLLC

(57) ABSTRACT

An exhaust pipe structure including paired separate exhaust pipes configured so that the paired separate exhaust pipes are supported in a vehicle provided horizontally in a manner such that a vertical load is applied from a first exhaust pipe, by a moment that turns the first exhaust pipe about an axis connecting two support members of the first exhaust pipe due to a weight of the first exhaust pipe, to a universal joint, and a vertical load is applied from a second exhaust pipe, by a moment that turns the second exhaust pipe about an axis connecting two support members of the second exhaust pipe due to a weight of the second exhaust pipe, to the universal joint. The vertical loads are approximately the same magnitude and act in opposite directions to combine to be substantially zero.

8 Claims, 5 Drawing Sheets

EXHAUST PIPE STRUCTURE

CROSS-REFERENCE TO RELATED APPLICATIONS

This application is a Continuation Application of U.S. application Ser. No. 12/095,151 filed May 28, 2008, which was the National Stage of International Application No. PCT/IB/2007/001833, filed Jul. 4, 2007.

BACKGROUND OF THE INVENTION

1. Field of the Invention

The present invention relates to a structure of an exhaust pipe connected to an internal combustion engine.

2. Description of the Related Art

Generally, vibrations generated by the internal combustion engine in operation are transmitted to the exhaust pipe connected to the internal combustion engine. A load caused by these vibrations is thus imposed on the exhaust pipe, which disadvantageously lowers durability and reliability of the exhaust pipe. In addition, the vibrations are transmitted through a support member for the exhaust pipe to a vehicle body, causing undesirable noise and vibrations in the vehicle interior. Therefore, in order to suppress transmission of exhaust pipe vibrations or absorb the vibrations, a widely used exhaust pipe structure has: an exhaust pipe including plural separate exhaust pipes connecting in series to join an exhaust manifold of the internal combustion engine; and a universal joint, such as spherical joint, used for connecting the separate exhaust pipes to allow them to bend flexibly at the joint. An example of this type of exhaust pipe structure is shown in Japanese patent application publication JP-A-2002-160536. The exhaust pipe includes a first exhaust pipe, a second exhaust pipe, and a tail pipe, the first and second exhaust pipes being joined by a spherical joint. The exhaust pipe thus formed inhibits transmission of vibrations from the internal combustion engine to the exhaust pipe. This improves durability and reliability of the exhaust pipe, while suppressing undesirable noise or vibrations in the vehicle interior.

The aforementioned exhaust pipe structure is designed such that the exhaust pipe is provided with heavy components, such as a muffler and a catalytic converter, imposing a load on the universal joint connecting the separate exhaust pipes. This can cause the exhaust pipe to be displaced from its normal position in the static state. When the vehicle travels off-road or over an uneven road surface, the exhaust pipe, supported at the position out of the normal mounting position, can be excessively displaced beyond the allowance range. Thus, the exhaust pipe tends to interfere with peripheral components. Preferably, the exhaust pipe is supported at a position adjacent to the universal joint, so that the exhaust pipe is prevented from being displaced from the normal position. Nonetheless, supporting the exhaust pipe in this preferred manner is sometimes difficult mainly due to insufficient body strength at the position adjacent to the universal joint. As described above, which part of the exhaust pipe to be supported and where to locate the universal joint depend on constraints of the vehicle body, such as body structure. This could result in difficulty in supporting the exhaust pipe at its normal position in the static state.

SUMMARY OF THE INVENTION

The present invention provides an exhaust pipe structure, which ensures that an exhaust pipe is supported at its normal mounting position.

A first aspect of the invention is directed to an exhaust pipe structure having: an exhaust pipe that includes plural separate exhaust pipes, connected in series to an internal combustion engine; and a universal joint that connects the separate exhaust pipes to allow these exhaust pipes to bend flexibly at the joints. The exhaust pipe structure is designed such that loads from the weight of the separate exhaust pipes, which act on the universal joint, combine to be almost zero.

According to the first aspect, the loads from the weight of the separate exhaust pipes that act on the universal joint, combine to be almost zero. Therefore, the universal joint is prevented from being displaced from its normal position in the static sate, thereby supporting the exhaust pipe at the normal mounting position. This prevents the exhaust pipe from being excessively displaced beyond the allowable range despite vibrations when the vehicle travels off-road or over an uneven road. Consequently, the exhaust pipe is precluded from interfering with peripheral components.

This also reduces the displacement of the exhaust pipe, thereby preventing an excessive increase in load on a spring member that applies a restoring force to the bending universal joint. Exhaust gas is thus prevented from leaking due to overload on the spring member.

The exhaust pipe is supported at its normal position by controlling the resultant load on the universal joint. This eliminates the necessity to provide an additional support member adjacent to the universal joint, for the exhaust pipe. Hence, the first aspect of the invention gives more flexibility in determining where to locate the support member for the exhaust pipe and the universal joint. This facilitates appropriate positioning of the support member and the universal joint, even if there are some constraints of a vehicle body structure, such as body strength for the location of the support member.

The exhaust pipe may include: a first exhaust pipe connected to the internal combustion engine in a fixed manner; a second exhaust pipe connected to the first exhaust pipe via a first flexible universal joint; and a third exhaust pipe connected to the second exhaust pipe via a second flexible universal joint. A first load from weight of the second exhaust pipe and a second load from weight of the third exhaust pipe, which are of approximately the same magnitude, may act on the second universal joint in opposite directions.

The exhaust pipe thus constructed includes: the first exhaust pipe connected to the internal combustion engine in a fixed manner; the second exhaust pipe connected to the first exhaust pipe via the first flexible universal joint; and the third exhaust pipe connected to the second exhaust pipe via the second flexible universal joint. The first load from the weight of the second exhaust pipe and the second load from the weight of the third exhaust pipe, which are of approximately the same magnitude, act on the second universal joint in opposite directions. Thus, almost zero-load results on the second universal joint. This prevents the second universal joint from being displaced from its normal position in the static state, thereby supporting the second exhaust pipe and the third exhaust pipe connecting in a displaceable manner at their respective normal mounting positions. The first load from the weight of the second exhaust pipe and the second load from the weight of the third exhaust pipe are cancelled out on the second universal joint. This results in almost zero-load acting on the first universal joint for connecting the first exhaust pipe and the second exhaust pipe. A load is thus prevented from being applied to the first exhaust pipe connected to the internal combustion engine in a fixed manner, thereby minimizing the adverse effects of the load on the internal combustion engine and other components.

The second exhaust pipe and the third exhaust pipe may be individually supported by two associated support members. A center of gravity of the second exhaust pipe may be located on the side of the second universal joint with respect to an axis connecting the two associated support members for the second exhaust pipe. A center of gravity of the third exhaust pipe may be located on the side opposite to the second universal joint with respect to an axis connecting the two associated support members for the third exhaust pipe.

The second exhaust pipe is supported by the two associated support members, and the center of gravity of the second exhaust pipe is located on the side of the second universal joint with respect to the axis connecting the two associated support members. This results in a load that presses down on the second universal joint. In turn, the third exhaust pipe is supported by the two associated support members, and the center of gravity of the third exhaust pipe is located on the side opposite to the second universal joint with respect to the axis connecting the two associated support members. This results in a load that presses up on the second universal joint. The thus-constructed support members for the second exhaust pipe and the third exhaust pipe help the resultant load, acting on the second universal joint, to be almost zero.

The second exhaust pipe and the third exhaust pipe may be individually supported by two associated support members. The center of gravity of the second exhaust pipe may be located on the side opposite to the second universal joint with respect to the axis connecting the two associated support members for the second exhaust pipe. The center of gravity of the third exhaust pipe may be located on the side of the second universal joint with respect to the axis connecting the two associated support members for the third exhaust pipe.

The second exhaust pipe is supported by the two associated support members, and the center of gravity of the second exhaust pipe is located on the side opposite to the second universal joint with respect to the axis connecting the two associated support members. This results in a load that presses up on the second universal joint. In turn, the third exhaust pipe is supported by the two associated support members, and the center of gravity of the third exhaust pipe is located on the side of the second universal joint with respect to the axis connecting the two associated support members. This results in a load acting on the second universal joint to press it down. The thus constructed support members for the second exhaust pipe and the third exhaust pipe help the resultant load, acting on the second universal joint, to be almost zero.

The third exhaust pipe may be constructed such that one of the two associated support members supports a part of the third exhaust pipe further from the second universal joint, while the other support member supports another part of the third exhaust pipe furthest from a phantom line connecting the one support member and the second universal joint.

The third exhaust pipe is supported by the other support member at the part furthest from the phantom line, which connects the one support member and the second universal joint, the one support member supporting the part of the third exhaust pipe further from the second universal joint. This minimizes turning motion of the third exhaust pipe about the phantom line, although the third exhaust pipe tends to vibrate intensively due to its location at a free end on the downstream side of exhaust gas flow. This reduces vibrations of the exhaust pipe when the vehicle travels off-road or over an uneven road surface, while suppressing undesirable noise and vibrations in the vehicle interior.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF PREFERRED EMBODIMENTS

An exhaust pipe structure according to the first embodiment of the present invention will be described below with reference to FIGS. 1 to 4.

Figure 1:
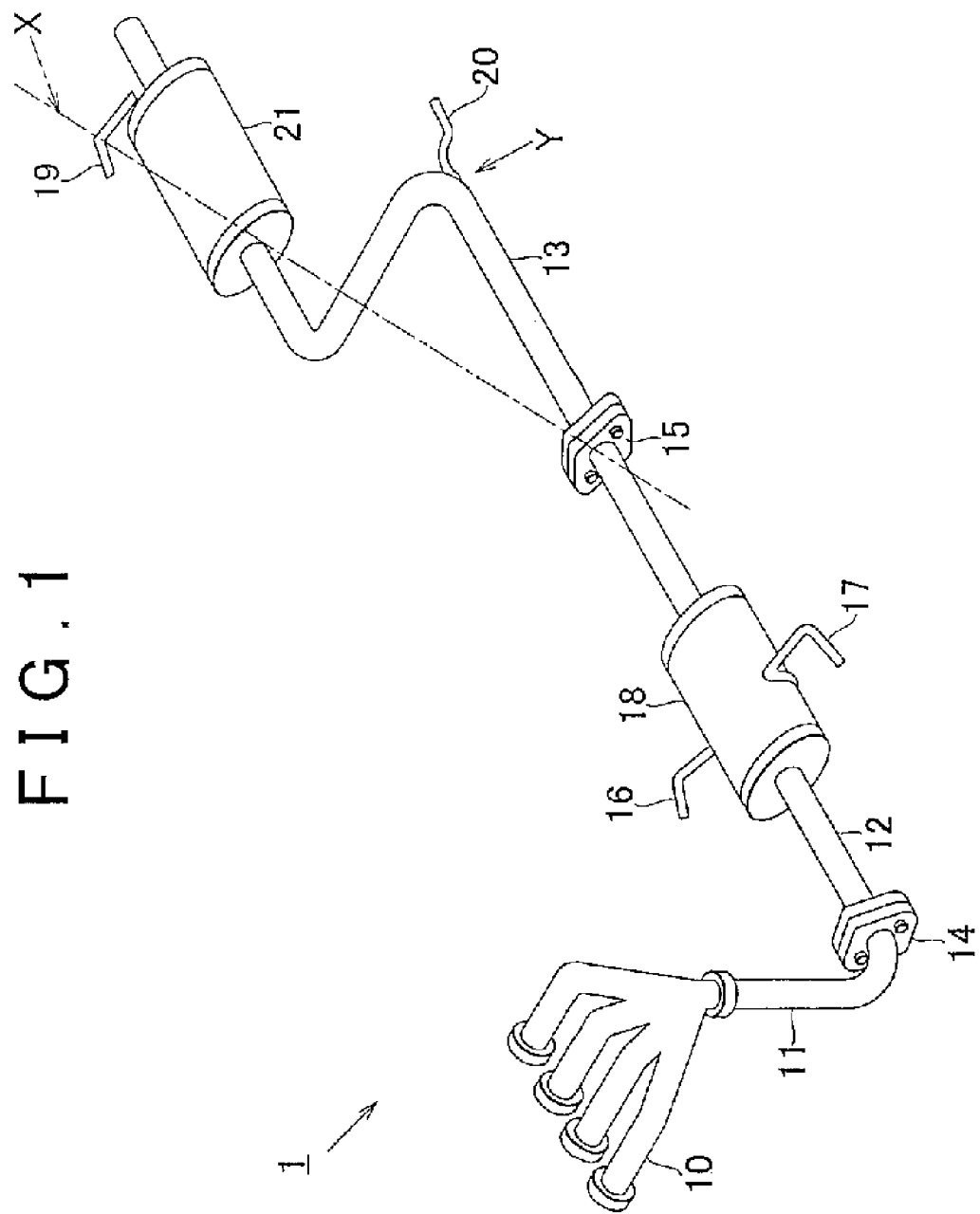
FIG. 1 is a perspective view of an exhaust pipe structure according to the first embodiment of the invention.

FIG. 1 is a perspective view of an exhaust pipe structure 1 according to the first embodiment of the invention. The exhaust pipe structure 1 includes: a first exhaust pipe 11 connected to an exhaust manifold 10 of the internal combustion engine; a second exhaust pipe 12 connected to the first exhaust pipe 11; and a third exhaust pipe 13 connected to the second exhaust pipe 12. The exhaust pipes 11, 12, 13 are provided in the lower portion of the vehicle body, where the internal combustion engine is mounted, in order of the first exhaust pipe 11, the second exhaust pipe 12, and the third exhaust pipe 13 from the front to the rear of the vehicle body. Exhaust gas from the internal combustion engine is discharged from the exhaust manifold 10 through the first exhaust pipe 11, the second exhaust pipe 12, and the third exhaust pipe 13 to the atmosphere.

The first exhaust pipe 11 is connected to the exhaust manifold 10 in a fixed manner. The second exhaust pipe 12 is connected to the first exhaust pipe 11 via a ball joint 14 (first universal joint). The third exhaust pipe 13 is connected to the second exhaust pipe 12 via another ball joint 15 (second universal joint).

Figure 2:
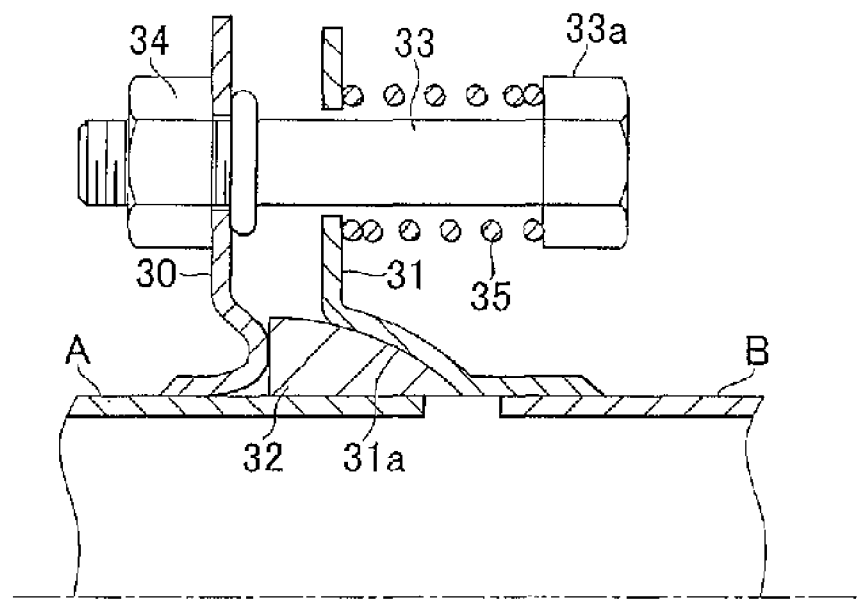
FIG. 2 is a schematic sectional view of a ball joint.

FIG. 2 is a schematic sectional view of the ball joint 14 or 15. The ball joints 14 and 15 are identical in construction. Each ball joint has a flange 30 fixed to one exhaust pipe A; a flange 31 fixed to the other exhaust pipe B, where the exhaust pipes A and B are connected to each other; and a seal member 32 in contact with a spherical section 31a of the flange 31. The flanges 30 and 31 are fixed to the associated exhaust pipes by fastening a bolt 33 to these flanges with a nut 34. A compression coil spring 35 is disposed between a head 33a of the bolt 33 and the flange 31 to impel the flanges 30 and 31 toward each other. This allows the flanges 30 and 31 to hold the seal member 32 with an axial compression force, ensuring the airtightness of the ball joint. The spherical section 31a of the flange 31 and the seal member 32 slide with respect to each other, such that the connecting exhaust pipes A and B may bend flexibly.

As described above, in the exhaust pipe structure 1, the exhaust pipe includes the plural separate exhaust pipes 11, 12, 13, connected in series, to join the exhaust manifold 10 of the internal combustion engine. Also, the ball joints 14 and 15 are used for connecting the separate exhaust pipes 11, 12, 13 to allow them to bend flexibly at the joints. Thus, the second exhaust pipe 12 and the third exhaust pipe 13 are displaceable relative to the internal combustion engine. Therefore, vibrations generated by the internal combustion engine are less likely to be transmitted to the second exhaust pipe 12 and the third exhaust pipe 13. This improves durability and reliability of the respective exhaust pipes 11, 12, 13, while suppressing undesirable noise or vibrations in the vehicle interior.

The second exhaust pipe 12 is supported by the vehicle body by two support members 16 and 17. The two support members 16 and 17 are provided on a catalytic converter 18 formed in the second exhaust pipe 12. In turn, the third exhaust pipe 13 is supported by the vehicle body by two support members 19 and 20. One of the support members, denoted as 19, which supports a part of the third exhaust pipe 13 further from the ball joint 15, is provided on a muffler 21 formed around the third exhaust pipe 13. The other support member 20 is provided at a part Y of the third exhaust pipe 13 furthest from a phantom line X connecting the support member 19 and the ball joint 15.

Figure 3:
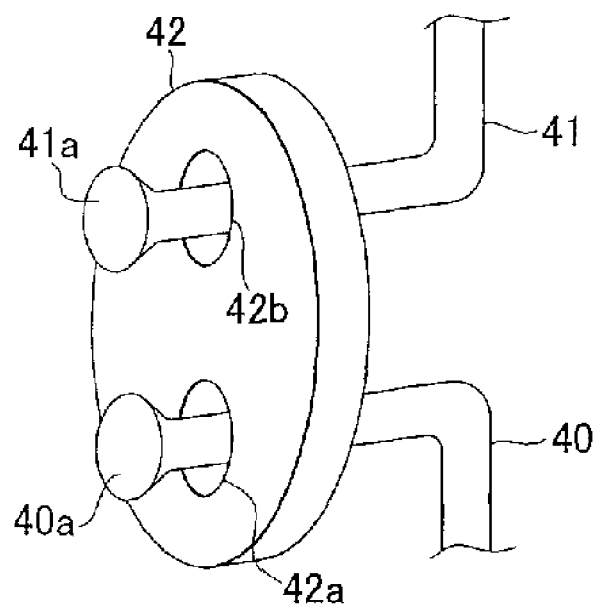
FIG. 3 is a schematic perspective view of a support member for an exhaust pipe.

FIG. 3 is a schematic perspective view of the support members 16, 17, 19, 20. The support members 16, 17, 19, 20 are identical in construction and each include a pipe hanger 40, a vehicle body hanger 41, and a rubber support 42. The pipe hanger 40 extends from the exhaust pipe. The vehicle body hanger 41 extends from the vehicle body. The rubber support 42 elastically connects the pipe hanger 40 and the vehicle body hanger 41. The rubber support 42 is an elastic member that has two through holes 42a and 42b. A distal end 40a of the pipe hanger 40 is inserted through the through hole 42a. A distal end 41a of the vehicle body hanger 41 is inserted through the through hole 42b. This allows the exhaust pipes to be supported by the vehicle body, while reducing vibrations to be transmitted from the exhaust pipes to the vehicle body.

Figure 4:
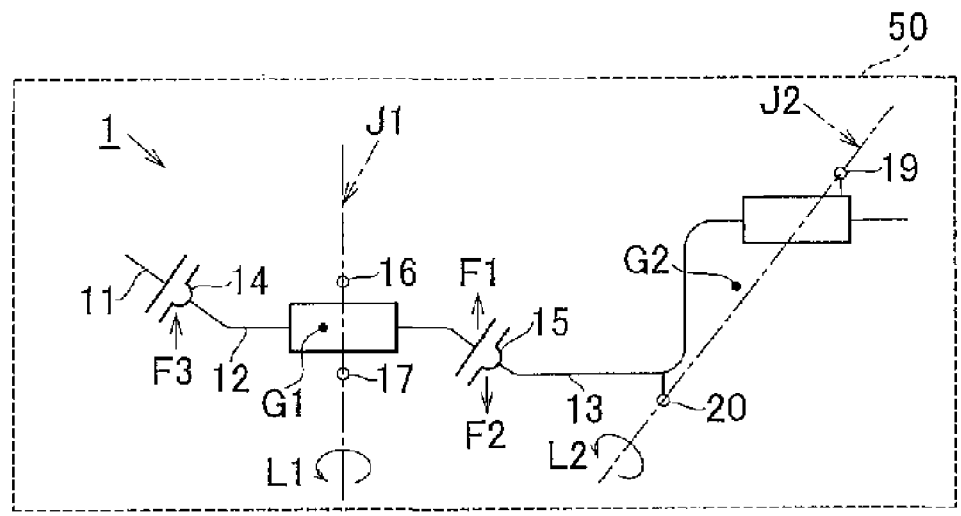
FIG. 4 is a schematic diagram of the exhaust pipe structure when viewed from above a vehicle body.

The exhaust pipe structure 1 in a static state will now be described. FIG. 4 is a schematic diagram of the exhaust pipe structure 1 when viewed from above a vehicle body 50. A load F1 (first load) and a load F2 (second load) are applied to the ball joint 15, the load F1 being from the weight of the second exhaust pipe 12, the load F2 being from the weight of the third exhaust pipe 13. The center of gravity G1 of the second exhaust pipe 12 is located on the forward side of the vehicle body 50, in other words, on the side opposite to the ball joint 15, with respect to the axis J1 connecting the support members 16 and 17. Thus, the weight of the second exhaust pipe 12 creates a moment that turns the exhaust pipe 12 about the axis J1 in the direction of the arrow L1. Accordingly, the load F1 is applied to the ball joint 15 in a direction that presses the ball joint 15 up (vertically upward from the sheet surface of FIG. 4, namely towards the vehicle body).

In turn, the center of gravity G2 of the third exhaust pipe 13 is located on the forward side of the vehicle body 50 with respect to an axis J2 connecting the support members 19 and 20, in other words, on the side of the ball joint 15. Thus, the weight of the third exhaust pipe 13 creates a moment that turns the exhaust pipe 13 about the axis J2 in the direction of the arrow L2. Accordingly, the load F2 is applied to the ball joint 15 in a direction that presses the ball joint 15 down (vertically downward from the sheet surface of FIG. 4, namely away from the vehicle body).

In the exhaust pipe structure 1, the ball joint 15, the support members 16 and 17, and the support members 19 and 20 are positioned such that the load F1 and the load F2 of approximately the same magnitude act in opposite directions. Therefore, the load F1 and the load F2, both acting on the ball joint 15, are cancelled out, so that the second exhaust pipe 12 and the third exhaust pipe 13 are supported at their respective normal mounting positions. As described above, the load F1 from the weight of the second exhaust pipe 12 and the load F2 from the weight of the third exhaust pipe 13 are cancelled out at the ball joint 15. This results in almost zero-load F3 acting on the ball joint 14 that connects the first exhaust pipe 11 and the second exhaust pipe 12.

The exhaust pipe structure according to the first embodiment provides the following effects. (1) A combined load of F1 and F2, which act on the ball joint 15, is almost zero. The ball joint 15 is thus prevented from being displaced from its normal position in the exhaust pipe structure 1 in the static state. This allows the second exhaust pipe 12 and the third exhaust pipe 13 to be supported at their respective normal mounting positions. Therefore, the second exhaust pipe 12 and the third exhaust pipe 13 are prevented from being excessively displaced beyond the allowable range despite vibrations when the vehicle travels off-road or over an uneven road surface. This precludes the second exhaust pipe 12 and the third exhaust pipe 13 from interfering with peripheral components.

(2) In the exhaust pipe structure 1 in the static state, the second exhaust pipe 12 and the third exhaust pipe 13 are supported at their respective normal mounting positions. This reduces the displacement of the second exhaust pipe 12 and the third exhaust pipe 13, and therefore, suppresses an excessive increase in force applied to the compression coil spring 35 of the ball joint 15. Hence, situations are avoided where an overload is applied to the compression coil spring 35 beyond its elastic deformation limit, causing exhaust gas leakage from the ball joint 15.

(3) The load F1 from the weight of the second exhaust pipe 12 and the load F2 from the weight of the third exhaust pipe 13, which both act on the ball joint 15, are cancelled out. Thus, eliminating the need for an additional support member, intended to reduce the displacement of the ball joint 15, adjacent to the ball joint 15. Thus, the first embodiment gives more flexibility in determining where to locate the support members 16 and 17 for the second exhaust pipe 12, the support members 19 and 20 for the third exhaust pipe 13, and the ball joints 14 and 15. This facilitates appropriate positioning of the support members 16, 17, 19, 20, and the ball joints 14 and 15, even if there are some constraints of the vehicle body structure, such as body strength for the locations of the support members 16, 17, 19, 20.

(4) The load F1 from the weight of the second exhaust pipe 12 and the load F2 from the weight of the third exhaust pipe 13 are cancelled out on the ball joint 15. This results in almost zero-load acting on the ball joint 14 in the exhaust pipe structure 1 in the static state. A load is thus prevented from being applied to the first exhaust pipe 11, which is connected to the internal combustion engine in a fixed manner, thereby minimizing the adverse effects of the load on the internal combustion engine and other components.

(5) The center of gravity G1 of the second exhaust pipe 12 is located on the side opposite to the ball joint 15 with respect to the axis J1 connecting the support members 16 and 17. The center of gravity G2 of the third exhaust pipe 13 is located on the side of the ball joint 15 with respect to the axis J2 connecting the support members 19 and 20. The relationship thus established between the center of gravity G1 and the axis J1 and between the center of gravity G2 and the axis J2 helps the resultant load, acting on the ball joint 15, be almost zero.

(6) The support member 20 for the third exhaust pipe 13 is provided on the part Y of the third exhaust pipe 13 furthest from the phantom line X connecting the support member 19 and the ball joint 15. Therefore, the turning motion of the third exhaust pipe 13 about the phantom line X is minimized, although the third exhaust pipe 13 tends to vibrate intensively due to its location at a free end on the downstream side of exhaust gas flow. This reduces vibrations of the exhaust pipe when the vehicle travels off-road or over an uneven road surface, while suppressing undesirable noise and vibrations in the vehicle interior.

An exhaust pipe structure according to the second embodiment of the present invention will be described below with reference to FIG. 5. The overall exhaust pipe structure is designed in the same manner as in the first embodiment, except for the locations of the center of gravity of the second exhaust pipe and the third exhaust pipe. In the following description of the second embodiment, components common to those described in the first embodiment are denoted as the same reference numeral, and the descriptions of these common components are omitted or simplified.

Figure 5:
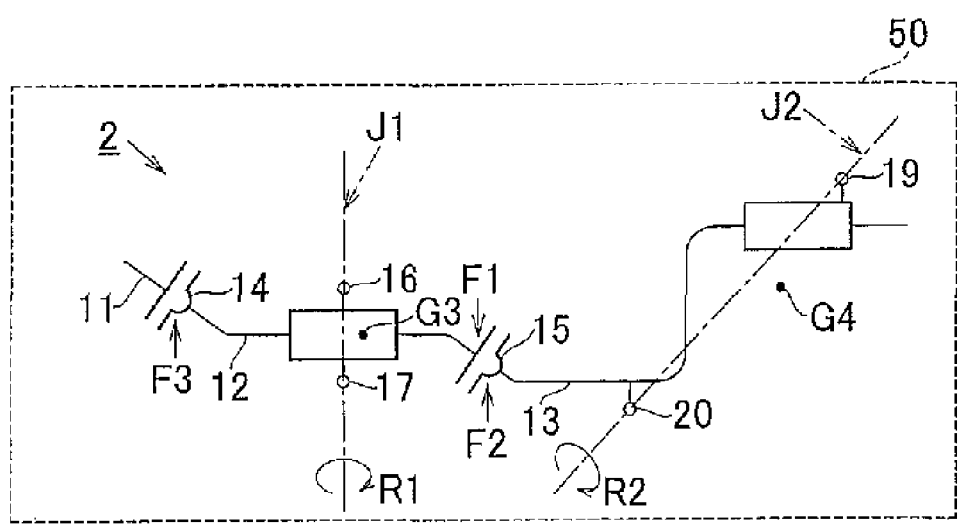
FIG. 5 is a schematic diagram of an exhaust pipe structure according to the second embodiment of the invention.

FIG. 5 is a schematic diagram of an exhaust pipe structure 2 according to the second embodiment, when viewed from above the vehicle body 50. The center of gravity G3 of the second exhaust pipe 12 is located towards the rear of the vehicle body 50 with respect to the axis J1, which connects the support members 16 and 17, in other words, on the side of the ball joint 15. Thus, the weight of the second exhaust pipe 12 creates a moment that turns the exhaust pipe 12 about the axis J1 in the direction of the arrow R1. Accordingly, the load F1 is applied to the ball joint 15 in a direction that presses the ball joint 15 down (vertically downward from the sheet surface of FIG. 5, namely away from the vehicle body).

In turn, the center of gravity G4 of the third exhaust pipe 13 is located on the rearward side of the vehicle body 50, in other words, on the side opposite to the ball joint 15, with respect to the axis J2 connecting the support members 19 and 20. Thus, the weight of the third exhaust pipe 13 creates a moment that turns the exhaust pipe 13 about the axis J2 in the direction of the arrow R2. Accordingly, the load F2 is applied to the ball joint 15 in a direction that presses the ball joint 15 up (vertically upward from the sheet surface of FIG. 5, namely towards the vehicle body).

The ball joint 15, the support members 16 and 17, and the support members 19 and 20 are positioned such that the load F1 and the load F2 of approximately the same magnitude act in opposite directions. Therefore, the load F1 and the load F2, both acting on the ball joint 15, are cancelled out, so that the second exhaust pipe 12 and the third exhaust pipe 13 are supported at their respective normal mounting positions. In addition, almost zero-load F3 acts on the ball joint 14 connecting the first exhaust pipe 11 and the second exhaust pipe 12.

The second embodiment provides the following effects in addition to the effects (1) to (4) achieved by the first embodiments. (7) The center of gravity G3 of the second exhaust pipe 12 is located on the side of the ball joint 15 with respect to the axis J1. The center of gravity G4 of the third exhaust pipe 13 is located on the side opposite to the ball joint 15 with respect to the axis J2. The relationship thus established between the center of gravity G3 and the axis J1 and between the center of gravity G4 and the axis J2 helps the resultant load, acting on the ball joint 15, be almost zero.

These above-described embodiments may be modified in the manner described below.

Figure 6A:
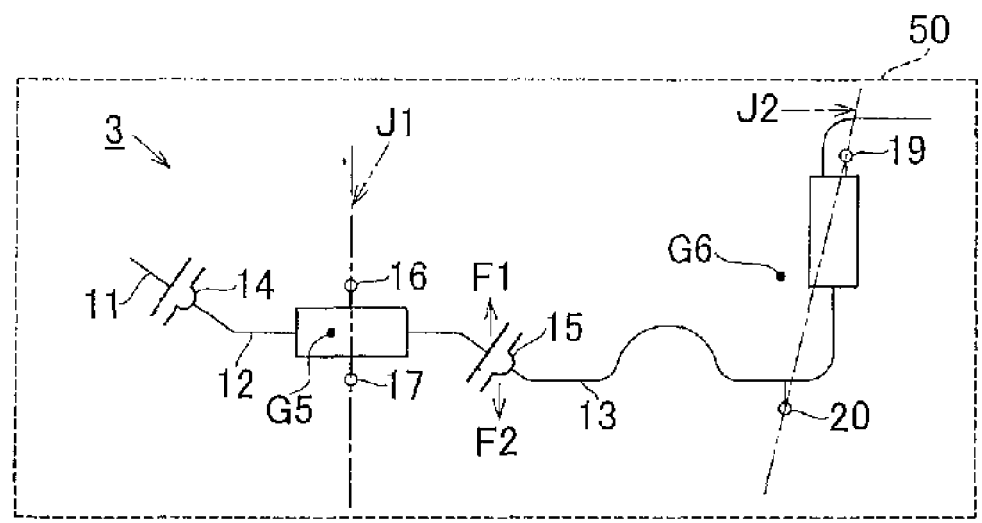
FIGS. 6A and 6B are schematic diagrams, illustrating variations of the exhaust pipe structure.
Figure 6B:
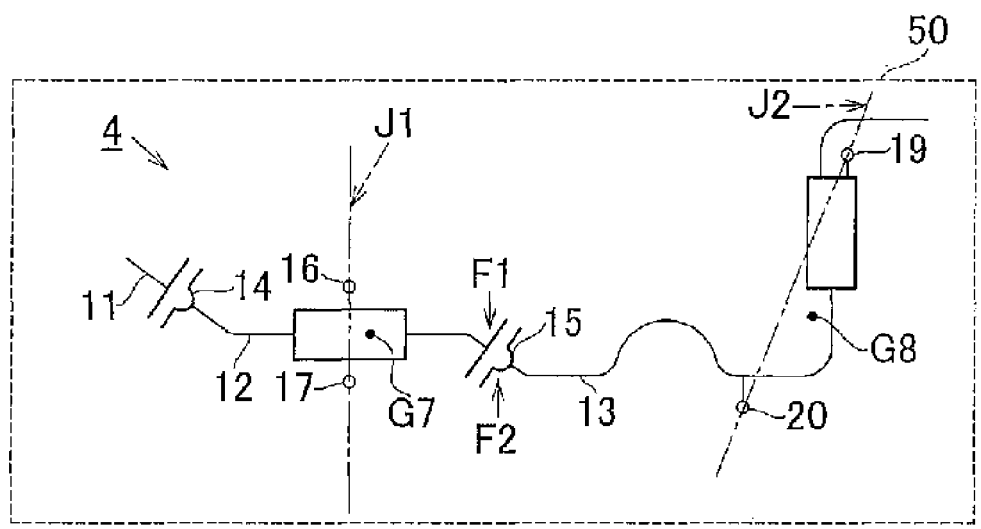

According to the first and the second embodiments, the load F1 and the load F2, which act on the ball joint 15, are cancelled out. This may apply to various types of exhaust pipe structures of different forms and arrangements. FIGS. 6A and 6B illustrate an exhaust pipe structure having a third exhaust pipe 13 of different form and support members 19 and 20 situated on the rearward side of the vehicle body 50. FIG. 6A is a schematic diagram of an exhaust pipe structure 3, in which the center of gravity G5 of the second exhaust pipe 12 and the center of gravity G6 of the third exhaust pipe 13 are respectively located on the forward side of the vehicle body 50 with respect to their associated axes J1 and J2. FIG. 6B is a schematic diagram of an exhaust pipe structure 4, in which the center of gravity G7 of the second exhaust pipe 12 and the center of gravity G8 of the third exhaust pipe 13 are respectively located on the rearward side of the vehicle body 50 with respect to their associated axes J1 and J2. The arrangement also allows the load F1 to cancel out the load F2, both of which act on the ball joint 15.

Figure 7A:
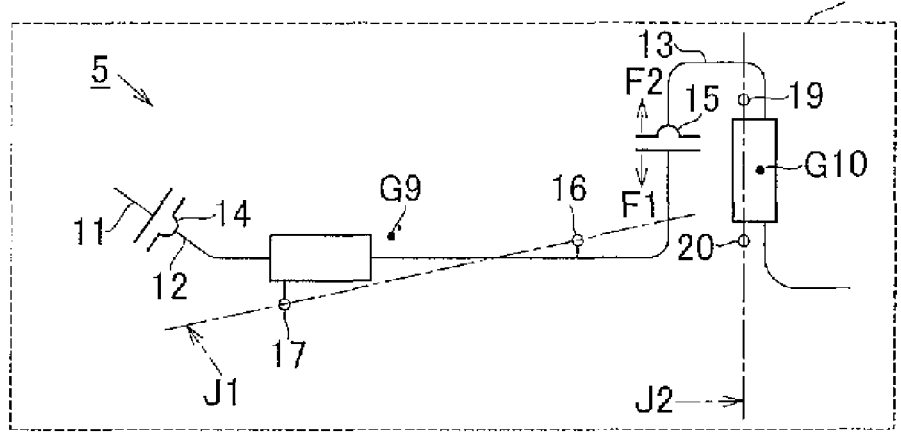
FIGS. 7A, 7B, and 7C are schematic diagrams, illustrating variations of the exhaust pipe structure.
Figure 7B:
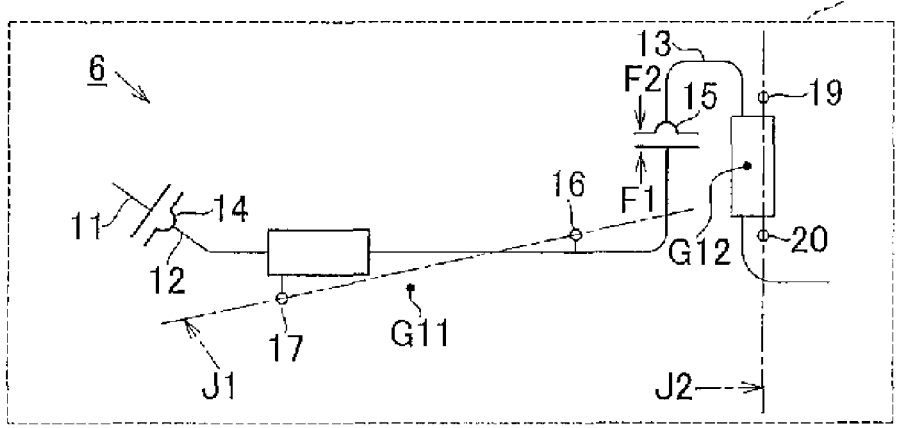
Figure 7C:
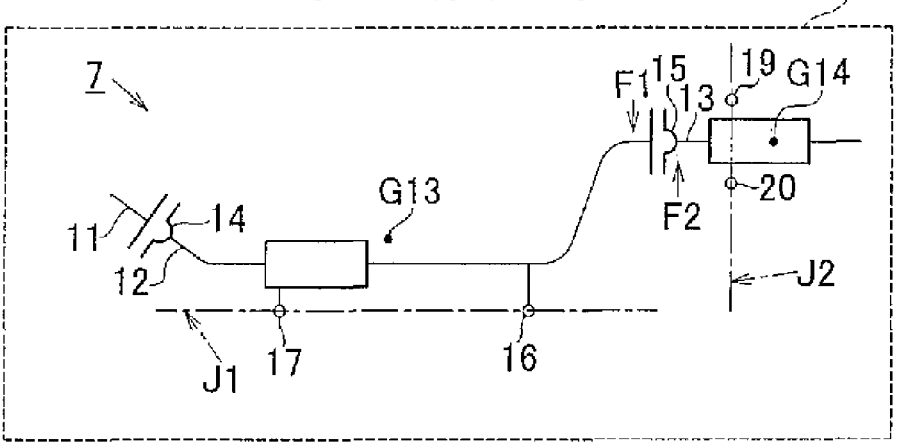

FIGS. 7A to 7C illustrate variations of the exhaust pipe structure. FIG. 7A is a schematic diagram of an exhaust pipe structure 5, in which a center of gravity G9 of the second exhaust pipe 12 and the ball joint 15 are located on the right side of the vehicle body 50 with respect to the axis J1. Also, a center of gravity G10 of the third exhaust pipe 13 is located towards the rear of the vehicle body 50 with respect to the axis J2. This arrangement results in a load F1 applied in a vertically downward direction from the sheet surface of FIG. 7A, as well as a load F2 applied in a vertically upward direction from the sheet surface of FIG. 7A. Thus, the load F1 cancels out the load F2. FIG. 7B is a schematic diagram of an exhaust pipe structure 6, in which a center of gravity G11 of the second exhaust pipe 12 is located on the left side of the vehicle body 50 with respect to the axis J1. Also, the ball joint 15 is located on the right side of the vehicle body 50 with respect to the axis J1. Further, a center of gravity G12 of the third exhaust pipe 13 is located towards the front of the vehicle body 50 with respect to the axis J2. This arrangement results in a load F1 applied in a vertically upward direction from the sheet surface of FIG. 7B, as well as a load F2 applied in a vertically downward direction from the sheet surface of FIG. 7B. Thus, the load F1 cancels out the load F2. FIG. 7C is a schematic diagram of an exhaust pipe structure 7, in which a center of gravity G13 of the second exhaust pipe 12 and the ball joint 15 are located on the right side of the vehicle body 50 with respect to the axis J1. Also, a center of gravity G14 of the third exhaust pipe 13 is located towards the rear of the vehicle body 50 with respect to the axis J2. This arrangement results in a load F1 applied in a vertically downward direction from the sheet surface of FIG. 7C, as well as a load F2 applied in a vertically upward direction from the sheet surface of FIG. 7C. Thus, the load F1 cancels out the load F2. Although not specifically shown in the drawing, locating the ball joint 15 on the axis J1 or J2 results in no load F1 or F2 acting on the ball joint 15. As discussed above, the present invention may be applied to various types of exhaust pipe structures of different forms and arrangements.

According to the first and the second embodiments, the catalytic converter 18 is formed on the second exhaust pipe 12, while the muffler 21 is formed on the third exhaust pipe 13. However, the catalytic converter 18 and the muffler 21 may be formed on any of the exhaust pipes 11, 12, 13. In addition, the support members 16, 17, 19, 20 may be provided in any location, as long as the load F1 and the load F2 cancel each other out.

According to the first and the second embodiments, the second exhaust pipe 12 and the third exhaust pipe 13 are individually supported by the two support members. However, additional support members may be provided to support each exhaust pipe.

According to the first and the second embodiments, the ball joints 14 and 15 are used to allow the separate exhaust pipes 11, 12, 13 to connect in a bendable manner. However, any other type of universal joint may be used, for example a flexible bellows joint.

According to the first and the second embodiments, the two ball joints 14 and 15 are used to connect the separate exhaust pipes to each other. However, three or more ball joints may be used for connecting the exhaust pipes. In the case of using three or more ball joints, the loads acting on the respective ball joints, combine to be almost zero, thereby supporting the exhaust pipe in its normal position in the static state.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within scope of the invention.

The invention claimed is:

1. An exhaust pipe structure comprising:
    a plurality of separate exhaust pipes connected in series as an exhaust pipe connected to an internal combustion engine, the plurality of separate exhaust pipes including paired separate exhaust pipes;
    a universal joint for connecting the paired separate exhaust pipes so that the paired separate exhaust pipes are configured to move with respect to one another at the universal joint,
    two support members that support a first exhaust pipe of the paired exhaust pipes respectively at two support portions; and
    two support members that support a second exhaust pipe of the paired exhaust pipes respectively at two support portions,
    wherein:
    the paired separate exhaust pipes are configured so that the paired separate exhaust pipes are supported in a vehicle provided horizontally in a manner such that
    a vertical load is applied from the first exhaust pipe, by a moment that turns the first exhaust pipe about an axis connecting the two support members of the first exhaust pipe due to a weight of the first exhaust pipe, to the universal joint, and
    a vertical load is applied from the second exhaust pipe, by a moment that turns the second exhaust pipe about an axis connecting the two support members of the second exhaust pipe due to a weight of the second exhaust pipe, to the universal joint,
    the vertical load of the first exhaust pipe and the vertical load of the second exhaust pipe being approximately the same magnitude and acting in opposite directions to each other so that the vertical load of the first exhaust pipe and the vertical load of the second exhaust pipe combine to be substantially zero;
    wherein
    a center of gravity of the first exhaust pipe is located at one side of the axis, connecting the two support members of the first exhaust pipe, that is proximal to the universal joint, and
    a center of gravity of the second exhaust pipe is located at one side of the axis, connecting the two support members of the second exhaust pipe, that is distal to the universal joint.

2. The exhaust pipe structure according to claim 1, wherein the second exhaust pipe includes a first straight section extending from the universal joint to a first bend, a second straight section extending from the first bend to a second bend, and a third straight section extending from the second bend and including a muffler; and
    one of the two support members of the second exhaust pipe is provided at the third straight section and the other of the two support members of the second exhaust pipe is provided at the first bend.

3. An exhaust pipe structure comprising:
    a plurality of separate exhaust pipes connected in series as an exhaust pipe connected to an internal combustion engine, the plurality of separate exhaust pipes including paired separate exhaust pipes;
    a universal joint for connecting the paired separate exhaust pipes so that the paired separate exhaust pipes are configured to move with respect to one another at the universal joint,
    two support members that support a first exhaust pipe of the paired exhaust pipes respectively at two support portions; and
    two support members that support a second exhaust pipe of the paired exhaust pipes respectively at two support portions,
    wherein:
    the paired separate exhaust pipes are configured so that the paired separate exhaust pipes are supported in a vehicle provided horizontally in a manner such that
    a vertical load is applied from the first exhaust pipe, by a moment that turns the first exhaust pipe about an axis connecting the two support members of the first exhaust pipe due to a weight of the first exhaust pipe, to the universal joint, and
    a vertical load is applied from the second exhaust pipe, by a moment that turns the second exhaust pipe about an axis connecting the two support members of the second exhaust pipe due to a weight of the second exhaust pipe, to the universal joint,
    the vertical load of the first exhaust pipe and the vertical load of the second exhaust pipe being approximately the same magnitude and acting in opposite directions to each other so that the vertical load of the first exhaust pipe and the vertical load of the second exhaust pipe combine to be substantially zero;
    wherein
    a center of gravity of the first exhaust pipe is located at one side of the axis, connecting the two support members of the first exhaust pipe, that is distal to the universal joint, and
    a center of gravity of the second exhaust pipe is located at one side of the axis, connecting the two support members of the second exhaust pipe, that is proximal to the universal joint.

4. The exhaust pipe structure according to claim 3, wherein the second exhaust pipe includes a first straight section extending from the universal joint to a first bend, a second straight section extending from the first bend to a second bend, and a third straight section extending from the second bend and including a muffler; and
    one of the two support members of the second exhaust pipe is provided at the third straight section and the other of the two support members of the second exhaust pipe is provided at the first bend.

5. An exhaust pipe structure comprising:
    a plurality of separate exhaust pipes connected in series as an exhaust pipe connected to an internal combustion engine;

universal joints that connect the separate exhaust pipes so that the plurality of separate exhaust pipes are configured to move with respect to one another at the universal joints, wherein:

the separate exhaust pipes include a first exhaust pipe fixedly connected to the internal combustion engine, a second exhaust pipe connected to the first exhaust pipe via a first universal joint of the universal joints, and a third exhaust pipe connected to the second exhaust pipe via a second universal joint of the universal joints;

two support members that support the second exhaust pipe respectively at two support portions; and two support members that support the third exhaust pipe respectively at two support portions, the separate exhaust pipes being configured so that the separate exhaust pipes are supported in a vehicle provided horizontally in a manner such that a vertical load is applied to the second universal joint by a moment that turns the second exhaust pipe about an axis connecting the two support members of the second exhaust pipe due to a weight of the second exhaust pipe and a vertical load is applied to the second universal joint by a moment that turns the third exhaust pipe about an axis connecting the two support members of the third exhaust pipe due to a weight of the third exhaust pipe, the vertical load of the second exhaust pipe and the vertical load of the third exhaust pipe being approximately the same magnitude and acting in opposite directions to each other so that the vertical loads combine to be substantially zero;

wherein a center of gravity of the second exhaust pipe is located at one side of the axis, connecting the two support members of the second exhaust pipe, that is proximal to the second universal joint, and a center of gravity of the third exhaust pipe is located at one side of the axis, connecting the two support members of the third exhaust pipe, that is distal to the second universal joint.

6. The exhaust pipe structure according to claim 5, wherein the third exhaust pipe includes a first straight section extending from the second universal joint to a first bend, a second straight section extending from the first bend to a second bend, and a third straight section extending from the second bend and including a muffler; and one of the two support members of the third exhaust pipe is provided at the third straight section and the other of the two support members of the third exhaust pipe is provided at the first bend.

7. An exhaust pipe structure comprising:

a plurality of separate exhaust pipes connected in series as an exhaust pipe connected to an internal combustion engine;

universal joints that connect the separate exhaust pipes so that the plurality of separate exhaust pipes are configured to move with respect to one another at the universal joints, wherein:

the separate exhaust pipes include a first exhaust pipe fixedly connected to the internal combustion engine, a second exhaust pipe connected to the first exhaust pipe via a first universal joint of the universal joints, and a third exhaust pipe connected to the second exhaust pipe via a second universal joint of the universal joints;

two support members that support the second exhaust pipe respectively at two support portions; and two support members that support the third exhaust pipe respectively at two support portions, the separate exhaust pipes being configured so that the separate exhaust pipes are supported in a vehicle provided horizontally in a manner such that a vertical load is applied to the second universal joint by a moment that turns the second exhaust pipe about an axis connecting the two support members of the second exhaust pipe due to a weight of the second exhaust pipe and a vertical load is applied to the second universal joint by a moment that turns the third exhaust pipe about an axis connecting the two support members of the third exhaust pipe due to a weight of the third exhaust pipe, the vertical load of the second exhaust pipe and the vertical load of the third exhaust pipe being approximately the same magnitude and acting in opposite directions to each other so that the vertical loads combine to be substantially zero;

wherein a center of gravity of the second exhaust pipe is located at one side of the axis, connecting the two support members of the second exhaust pipe, that is distal to the second universal joint, and a center of gravity of the third exhaust pipe is located at one side of the axis, connecting the two support members of the second exhaust pipe, that is proximal to the second universal joint.

8. The exhaust pipe structure according to claim 7, wherein the third exhaust pipe includes a first straight section extending from the second universal joint to a first bend, a second straight section extending from the first bend to a second bend, and a third straight section extending from the second bend and including a muffler; and one of the two support members of the third exhaust pipe is provided at the third straight section and the other of the two support members of the third exhaust pipe is provided at the first bend.

* * * * *